(12) United States Patent
Takeda

(10) Patent No.: US 8,524,385 B2
(45) Date of Patent: Sep. 3, 2013

(54) BATTERY PACK

(75) Inventor: Takashi Takeda, Atsugi (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 914 days.

(21) Appl. No.: 12/248,962

(22) Filed: Oct. 10, 2008

(65) Prior Publication Data

US 2010/0092844 A1 Apr. 15, 2010

(51) Int. Cl.
*H01M 10/48* (2006.01)
(52) U.S. Cl.
USPC .......................................................... 429/90
(58) Field of Classification Search
USPC .......................................................... 429/90
See application file for complete search history.

(56) References Cited

U.S. PATENT DOCUMENTS

| 5,530,336 | A | 6/1996 | Eguchi et al. | |
| 7,375,498 | B2 * | 5/2008 | Yamamoto | 320/150 |
| 2005/0077878 | A1 * | 4/2005 | Carrier et al. | 320/134 |

FOREIGN PATENT DOCUMENTS

| JP | 06-105458 | 4/1994 |
| JP | 2000-152516 | 5/2000 |
| JP | 2002-044871 | 2/2002 |
| JP | 2002044871 A * | 2/2002 |
| JP | 2004-152580 | 5/2004 |
| JP | 2004-226185 | 8/2004 |
| JP | 2005-183098 | 7/2005 |

OTHER PUBLICATIONS

Japanese Office Action mailed Jan. 24, 2012.
Japanese Office Action dated Nov. 27, 2012.

* cited by examiner

*Primary Examiner* — Karie O'Neill Apicella
(74) *Attorney, Agent, or Firm* — IPUSA, PLLC

(57) ABSTRACT

A battery pack has a secondary battery, first and second switch devices provided between the secondary battery and a load or a charging unit, a protection circuit detecting an overcharge, an overdischarge or an overcurrent of the secondary battery and controlling turning on and off of the first and second switch devices, a series circuit of a resistor and a thermistor disposed in the vicinity of the secondary battery and connected in parallel with the secondary battery, a comparator which compares a voltage at a connection point between the thermistor and the resistor with a reference voltage corresponding to a predetermined temperature inside the protection circuit, and a third switch device connected between the resistor and a negative electrode of the secondary battery. The protection circuit turns off the first switch device and the third switch device when an overdischarge of the secondary battery is detected.

5 Claims, 5 Drawing Sheets

BATTERY PACK

BACKGROUND ART

1. Technical Field

The present invention relates a battery pack, and relates to a battery pack provided with a protection circuit which detects an overcharge, an overdischarge or an overcurrent of a secondary battery and turns off a switch device provided between the secondary battery and a load or a charging unit.

2. Description of the Related Art

In recent years, a lithium-ion battery acting as a secondary battery is mounted in a portable device such as a digital camera. A lithium-ion battery has a low tolerance to an overcharge and an overdischarge. Therefore, a lithium-ion battery is used in a form of a battery pack provided with a protection circuit against an overcharge and an overdischarge.

FIGS. 4 and 5 depict respective examples of a block diagram of a battery pack in the related art. An example of FIG. 4 will be described first. In the example of FIG. 4, a series circuit of a resistor R1 and a capacitor C1 is connected in parallel with a lithium-ion battery 2. A positive electrode of the lithium-ion battery 2 is connected to an external terminal 3 of the battery pack 1. A negative electrode of the lithium-ion battery is connected to an external terminal 4 of the battery pack 1 via n-channel MOS (Metal-Oxide Semiconductor) transistors M1 and M2 which are used to break an electric current.

Drains of the MOS transistors M1 and M2 are connected together. A source of the MOS transistor M1 is connected to the negative electrode of the lithium-ion battery 2. A source of the MOS transistor M2 is connected to the external terminal 4. Further, between drains and sources of the MOS transistors M1 and M2, body diodes D1 and D2 are connected, respectively, equivalently.

A protection IC (i.e., an integrated circuit) 5 has a built-in overcharge detecting circuit, overdischarge detecting circuit and overcurrent detecting circuit. Further, power supply Vdd is provided from a positive electrode of the lithium-ion battery 2 to the protection IC 5 via the resistor R1. Power supply Vss is provided from the negative electrode of the lithium-ion battery 2 to the protection IC 5. Therewith, the protection IC 5 operates.

When an overdischarge or an overcurrent is detected by the overdischarge detecting circuit or the overcurrent detecting circuit in the protection IC 5, a DOUT output of the protection IC 5 comes to have a low level which turns off the MOS transistor M1. When an overcharge is detected by the overcharge detecting circuit in the protection IC 5, a COUT output of the protection IC 5 comes to have a low level which turns off the MOS transistor M2.

Next, an example depicted in FIG. 5 will be described. In the example of FIG. 5, a thermistor R3 is provided in a battery pack 1. One end of the thermistor R3 is connected to a terminal 6 of the battery pack 1. The other end of the thermistor R3 is connected to an external terminal 4. When charging is carried out, a predetermined voltage is applied to the terminal 6 of the battery pack 1 from a charging unit via a voltage dividing resistor. A resistance value of the thermistor R3 changes as a temperature of the battery pack 1 changes. As a result, a voltage at the terminal 6 changes accordingly. The charging unit carries out control such as to detect a voltage at the terminal 6, and stop charging when the temperature of the battery pack 1 exceeds a predetermined value.

According to Japanese Laid-Open Patent Application No. 2004-152580, a series circuit of a temperature protection device (here, a PTC device) and a diode is connected in series with a secondary battery. Further, in parallel with the series circuit, a diode is connected in a reverse direction. By this circuit configuration, the temperature protection device is prevented from operating even when a high temperature occurs during regular discharging of the secondary battery.

The battery pack depicted in FIG. 4 in the related art has no protection function against temperature of the battery pack. On the other hand, the battery pack depicted in FIG. 5 in the related art has a protection function against temperature of the battery pack. However, the predetermined voltage is applied from the charging unit via the voltage dividing resistor to the battery pack of FIG. 5 in the related art. Therefore, a temperature of the battery pack may not be detected precisely when the predetermined voltage of the charging unit changes or an error occurs in a resistance value of the voltage dividing resistor of the charging unit. As a result, protection of the battery pack against temperature may not be carried out with high accuracy.

The present invention has been devised in consideration of the point, and an object of the present invention is to provide a battery pack in which it is possible to carry out protection of the battery pack against temperature with high accuracy.

SUMMARY OF THE INVENTION

In order to achieve the above-mentioned object, according to the present invention, a battery pack has a secondary battery, first and second switch devices provided in wiring provided between the secondary battery and a load or a charging unit, a protection circuit configured to detect an overcharge, an overdischarge or an overcurrent of the secondary battery and configured to control turning on and off of the first and second switch devices, a series circuit of a resistor and a thermistor disposed in the vicinity of the secondary battery and connected in parallel with the secondary battery, a comparator provided inside the protection circuit and comparing a voltage at a connection point between the thermistor and the resistor to a reference voltage corresponding to a predetermined temperature, and a third switch device connected between the resistor and a negative electrode of the secondary battery. The protection circuit turns off each of the first switch device and the third switch device when an overdischarge of the secondary battery is detected.

DESCRIPTION OF REFERENCE NUMERALS

10, 10A BATTERY PACK
12 LITHIUM-ION BATTERY
13, 14, TH EXTERNAL TERMINAL
15, 15A PROTECTION CIRCUIT
16 OVERCHARGE DETECTING CIRCUIT
17 OVERDISCHARGE DETECTING CIRCUIT
18 OVERCURRENT DETECTING CIRCUIT

19 LOGIC CIRCUIT
20 CONSTANT VOLTAGE SOURCE
21 COMPARATOR
22 INSENSITIVE TIME SETTING CIRCUIT
M11, M12, M13 MOS TRANSISTOR
R11, R12, R23 RESISTOR
R13 THERMISTOR

DESCRIPTION OF THE PREFERRED EMBODIMENT

A battery pack (10A) in an embodiment of the present invention is provided with a protection circuit (15A) which detects an overcharge, an overdischarge or an overcurrent of a secondary battery (12) and controls turning on and off of first and second switch devices (M11, M12) provided in wiring between the secondary battery and a load or a charging unit.

Further, the battery pack (10A) has a series circuit of a resistor (R14) and a thermistor (R13) disposed in the vicinity of the secondary battery (12) and connected in parallel with the secondary battery (12), a comparator (21) which compares a voltage at a connection point between the thermistor (R13) and the resistor (R14) with a reference voltage corresponding to a predetermined temperature inside the protection circuit (15A), and a third switch device (M13) connected between the resistor (R14) and a negative electrode of the secondary battery (12). The protection circuit (15A) turns off each of the first switch device (M11) and the third switch device (M13), when an overdischarge of the secondary battery (12) is detected. As a result, it is possible to carry out protection of the secondary battery against temperature with high accuracy.

Further, each of the first, second and third switch devices (M11, M12, M13) may be an n-channel MOS transistor.

Further, the thermistor (R13) may be a NTC thermistor having a negative temperature coefficient.

In the embodiment of the present invention, it is possible to carry out protection of the secondary battery against temperature with a high accuracy.

REFERENCE EXAMPLE

Prior to a detailed description of the embodiment, a reference example will now be described.

Figure 1:
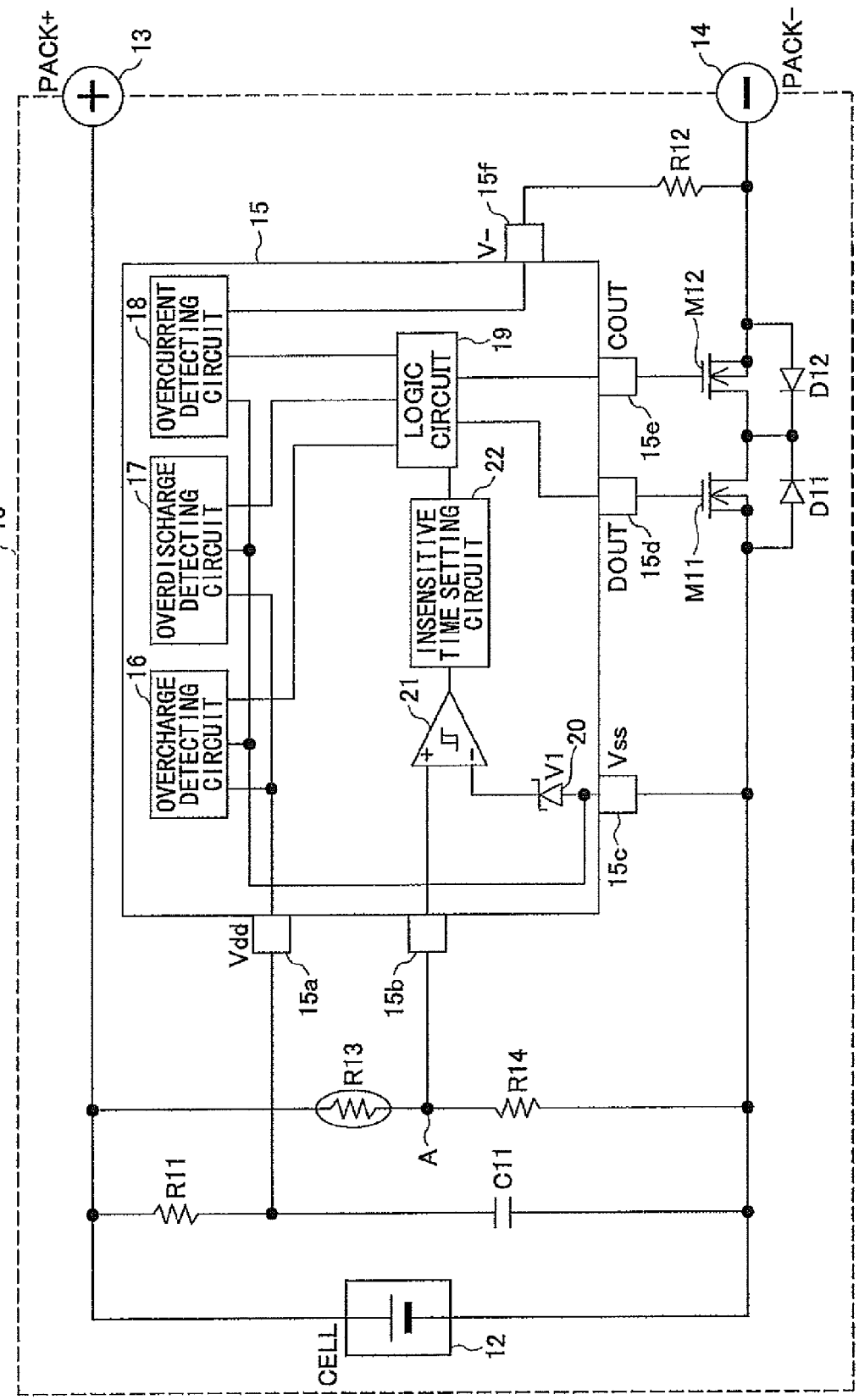
FIG. 1 depicts a block diagram of a battery pack in a reference example.

FIG. 1 depicts a block diagram of a battery pack 10 in the reference example. In FIG. 1, a series circuit of a resistor R11 and a capacitor C11 is connected in parallel with a lithium-ion battery 12. A positive electrode of the lithium-ion battery 12 is connected to an external terminal 13 of the battery pack 10 by means of wiring, and a negative electrode of the lithium-ion battery 12 is connected to an external terminal 14 of the battery pack 10 by means of wiring via n-channel transistors N11 and N12 used for breaking an electric current.

Drains of both MOS transistors M11 and M12 are connected together, a source of the MOS transistor M11 is connected to the negative electrode of the lithium-ion battery 12, and a source of the MOS transistor M12 is connected to the external terminal 14. Further, body diodes D11 and D12 are connected between drains and sources of the MOS transistors M11 and M12, respectively, equivalently.

Further, a series circuit of a thermistor R13 and a resistor R14 is connected in parallel with the lithium-ion battery 12. The thermistor R13 is disposed in the vicinity of the lithium-ion battery 12, and thermal coupling is provided between the thermistor R13 and the lithium-ion battery 12. A NTC (Negative Temperature Coefficient) thermistor having a negative temperature coefficient is used as the thermistor R13.

Figure 2:
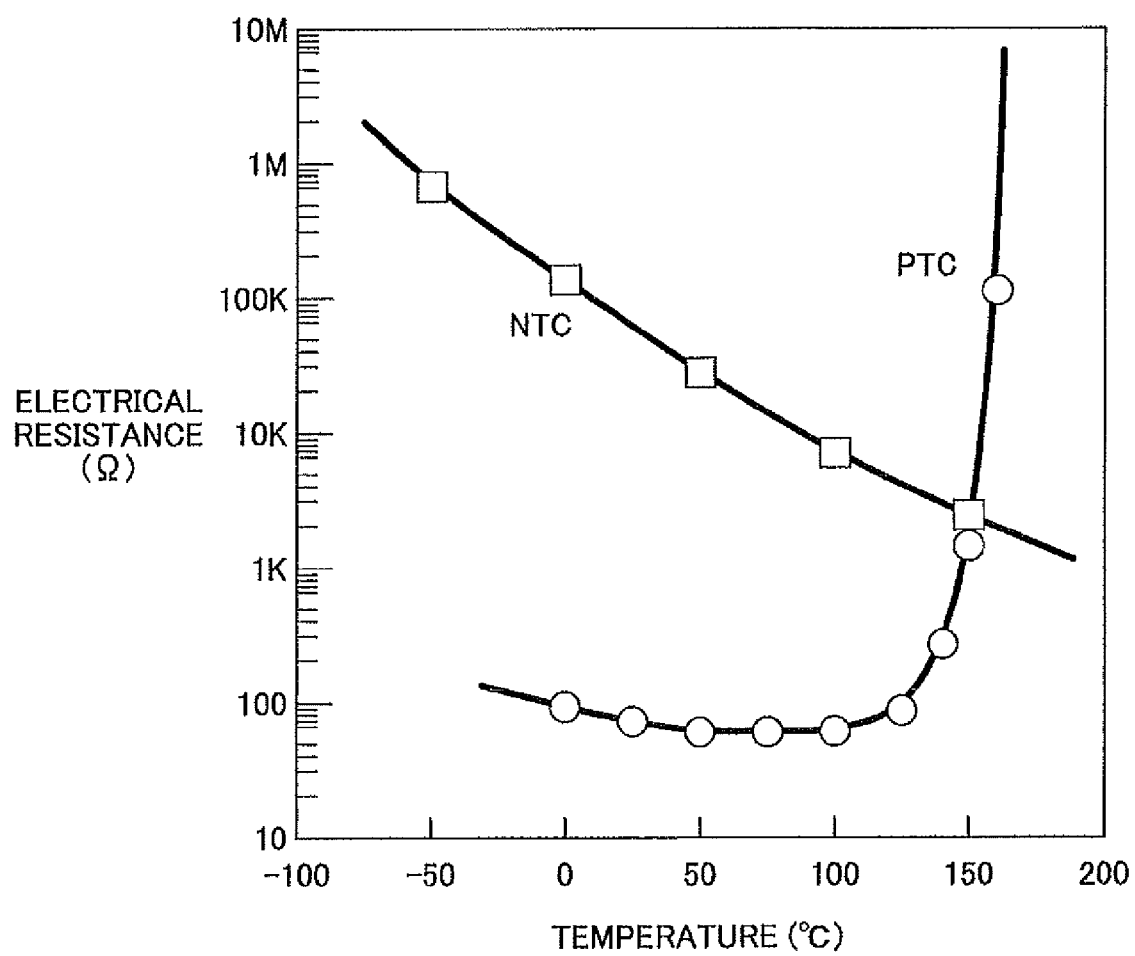
FIG. 2 depicts a characteristic of a resistance with respect to a temperature of each of an NTC thermistor and a PTC thermistor.

FIG. 2 depicts a characteristic of resistance with respect to a temperature for each of a NTC thermistor having a negative temperature coefficient and a PTC (Positive Temperature Coefficient) thermistor having a positive temperature coefficient.

A protection IC 15 has a built-in overcharge detecting circuit 16, overdischarge detecting circuit 17 and overcurrent detecting circuit 18. Further, the protection IC 15 has a power supply Vdd provided thereto at a terminal 15a from the positive electrode of the lithium-ion battery 12 via a resistor R11, has a power supply Vss provided thereto at a terminal 15c from the negative electrode of the lithium-ion battery 12, and therewith, the protection IC 15 operates.

The overcharge detecting circuit 16 detects an overcharge of the lithium-ion battery 12 from voltages at the terminals 15a and 15c, and provides a corresponding overcharge detection signal to a logic circuit 19. The overdischarge detecting circuit 17 detects an overdischarge of the lithium-ion battery 12 from voltages at the terminals 15a and 15c, and provides a corresponding overdischarge detection signal to the logic circuit 19. The overcurrent detecting circuit 18 detects from voltages at terminals 15c and 15f an overcurrent state in which an electric current flowing through a resistor R12 becomes excessive, and provides a corresponding overcurrent detection signal to the logic circuit 19.

Further, a connection point A between the thermistor R13 and the resistor R14 is connected to a terminal 15b of the protection IC 15, and one end of the resistor R12 is connected to the terminal 15f of the protection IC 15. The other end of the resistor R12 is connected to the external terminal 14. Further, a gate of the MOS transistor M11 is connected to a DOUT output terminal 15d of the protection IC 15, and a gate of the MOS transistor M12 is connected to a COUT output terminal 15e of the protection IC 15.

In the protection IC 15, the terminal 15b is connected to a non-inverted input terminal of a comparator 21. The terminal 15c is connected to a negative electrode of a constant voltage source 20 such a zener diode, and a positive electrode of the constant voltage source 20 is connected to an inverted input terminal of the comparator 21.

The thermistor R13 is the NTC thermistor having the negative temperature coefficient as depicted in FIG. 2. Therefore, as a temperature rises, a resistance value of the thermistor R13 decreases, and as a result, a voltage at the connection point A increases.

The comparator 21 has a hysteresis characteristic. The comparator 21 compares a constant voltage V1 generated by the constant voltage source 20 with the voltage at the connection point A. When the voltage at the connection point A is higher, the comparator 21 outputs a signal of a high level. That is, when a detection temperature of the thermistor R13 exceeds a predetermined temperature (for example, on the order of 70° C.) corresponding to the constant voltage V1, the comparator 21 outputs a high temperature detection signal of a high level.

The high temperature detection signal output by the comparator 21 is provided to an insensitive time setting circuit 22. The insensitive time setting circuit 22 provides a high temperature detection signal of a high level to a logic circuit 19 when a time for which the high level of the high temperature detection signal provided by the comparator 21 holds exceeds a predetermined value (for example, 5 seconds).

The overcharge detection signal, the overdischarge detection signal and the overcurrent detection signal are provided to the logic circuit 19 from the overcharge detecting circuit 16, the overdischarge detecting circuit 17 and the overcurrent detecting circuit 18, respectively. Further, the high temperature detection signal is provided to the logic circuit 19 from the insensitive time setting circuit 22.

When the overcharge detection signal is provided by the overcharge detecting circuit 16, the logic circuit 19 provides a low level of a COUT output at the terminal 15e to cause the MOS transistor M12 to enter a breaking state. When the overdischarge detection signal is provided by the overdischarge detecting circuit 17, the logic circuit 19 provides a low level of a DOUT output at the terminal 15d to cause the MOS transistor M11 to enter a breaking state. When the overcurrent detection signal is provided by the overcurrent detecting circuit 18, the logic circuit 19 provides a low level of a DOUT output at the terminal 15d to cause the MOS transistor M12 to enter a breaking state.

When the high temperature detection signal is provided, the logic circuit 19 provides a low level of a COUT output at the terminal 15e to cause the MOS transistor M12 to enter a breaking state. Thus, in the battery pack 10, a temperature of the lithium-ion battery 12 is accurately detected, and also, when the lithium-ion battery 12 has a high temperature, charging of the lithium-ion battery 12 is stopped. As a result, the lithium-ion battery 12 is protected.

Further, as the thermistor R13, a NTC thermistor having a resistance value which changes approximately linearly with respect to a temperature as shown in FIG. 2 is used. As a result, a temperature can be detected precisely. As the thermistor R13 is disposed in the vicinity of the lithium-ion battery 12 inside the battery pack 1, a temperature of the lithium-ion battery 12 can be detected precisely. It is noted that, because a PTC thermistor is such that a resistance value increases sharply when a certain temperature is exceeded, the temperature may not be detected precisely.

In the battery pack 1 in the reference example described above with reference to FIG. 1, the series circuit of the thermistor R13 included in a temperature detecting circuit and the resistor R14 is connected in parallel to the lithium-ion battery 12. Therefore, a loop is formed by the lithium-ion battery 12, the thermistor R13 and the resistor R14.

As a result, in the battery pack 1 in the reference example, even when the MOS transistor M11 enters a breaking state as a result of an overdischarge being detected, the lithium-ion battery discharges through the loop. Therefore, in the battery pack 1 in the reference example, even in a condition of an overdischarge, the lithium-ion battery 12 may further discharge. In contrast thereto, according to the embodiment which will be described below, the further discharge after the detection of the overdischarge can be stopped.

Embodiment

Below, the embodiment will be described in detail.

Figure 3:
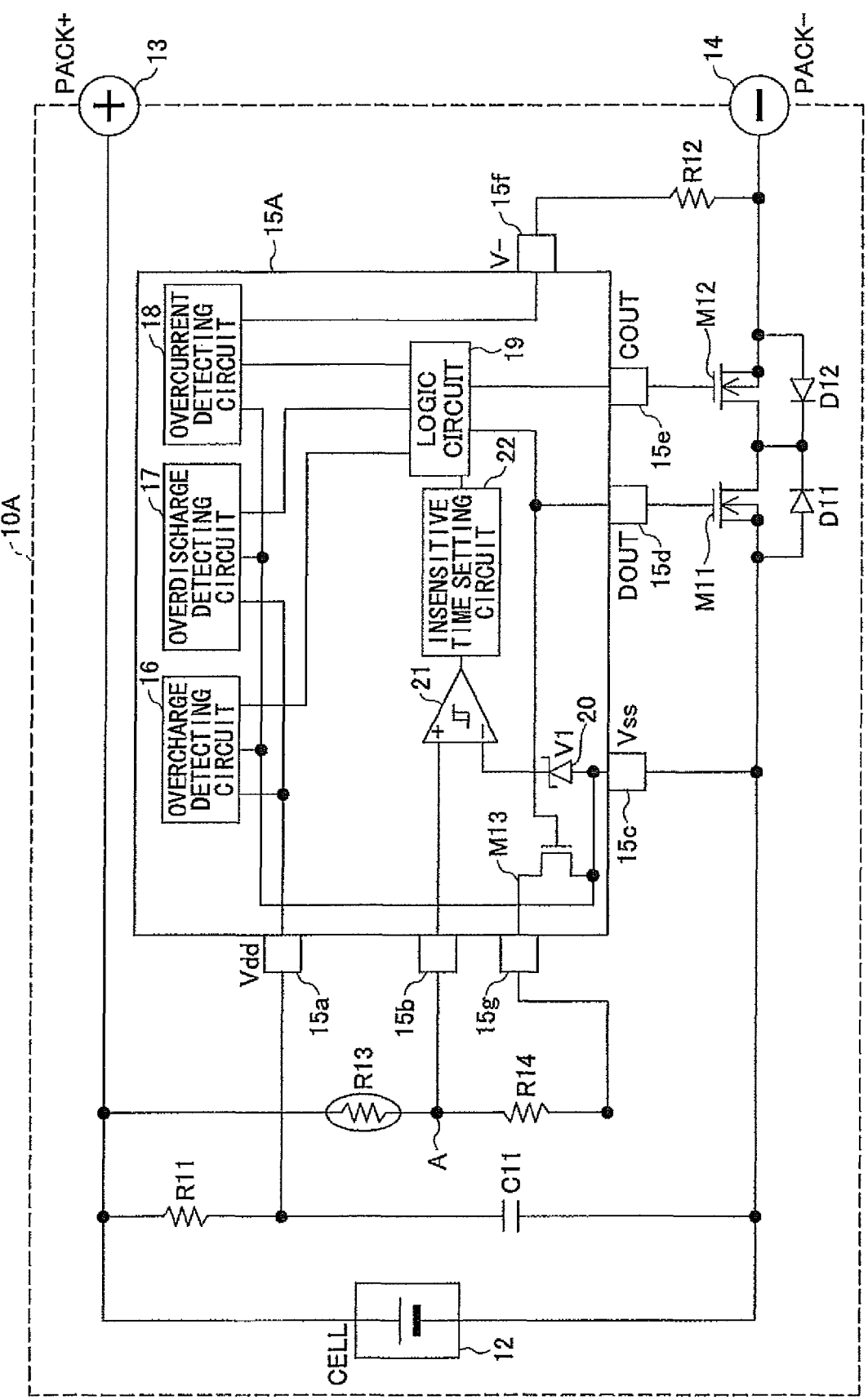
FIG. 3 depicts a block diagram of a battery pack in one embodiment.
Figure 4:
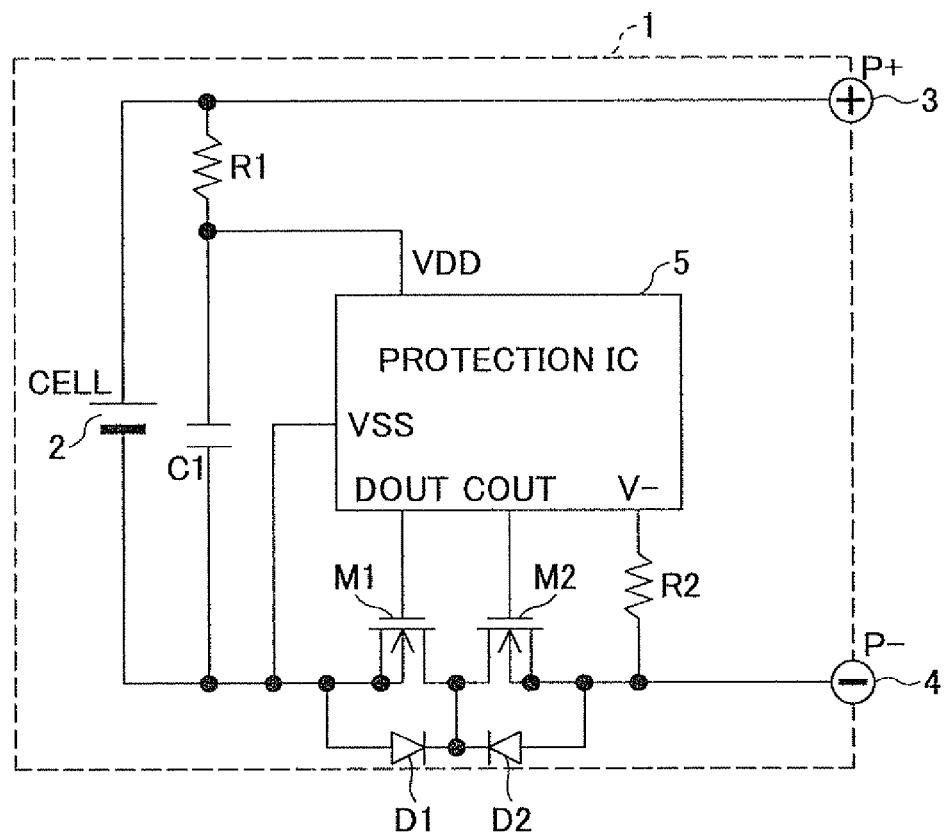
FIG. 4 depicts a block diagram of one example of a battery pack in the related art.
Figure 5:
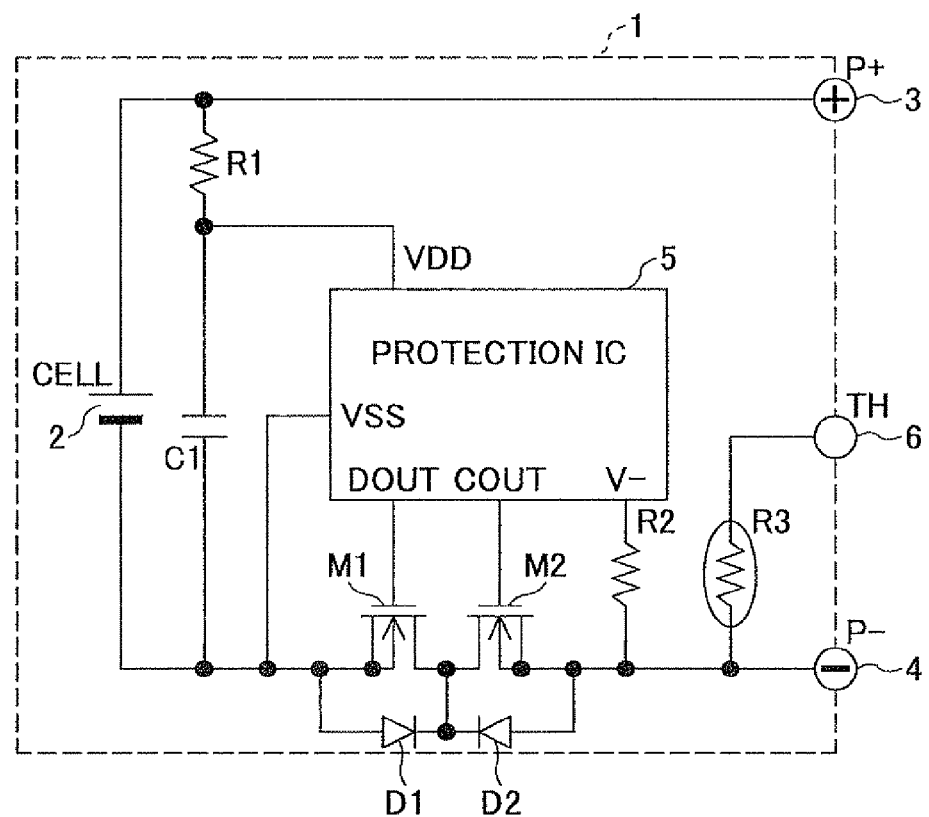
FIG. 5 depicts a block diagram of another example of a battery pack in the related art.

FIG. 3 depicts a block diagram of a battery pack in the embodiment. In FIG. 3, the same reference numerals are given to parts same as those depicted in FIG. 1, and duplicate description will be omitted.

The battery pack 10A in the embodiment has a protection IC 15A that is different from the protection IC 15 of the battery pack 10 in the reference example shown in FIG. 1, in the following points. That is, the protection IC 15A of the battery pack 10A in the embodiment has a terminal 15g in addition to the respective terminals the protection IC 15 of the battery pack 10 in the reference example has. Further, the protection IC 15A in the embodiment has a MOS transistor M13 acting as a switch device connected between terminals 15g and 15c. An output signal of the logic circuit 19 is provided to a gate of the MOS transistor M13. It is noted that, the MOS transistor M13 is an n-channel MOS transistor which is the same as the above-mentioned MOS transistors M11 and M12.

In the battery pack 10A in the embodiment, one end of the resistor R14 is connected to the connection point A, and the other end of the resistor R14 is connected to the terminal 15g. As a result, the resistor R14 is connected to the negative electrode of the lithium-ion battery 12 via the MOS transistor M13. As a further result, in the battery pack 10A in the embodiment, a loop is formed by the lithium-ion battery 12, the thermistor R13, the resistor R14 and the MOS transistor M13.

The logic circuit 19 in the battery pack 10A in the embodiment provides a low level of a DOUT output at the terminal 15d to cause the MOS transistor M11 to enter a breaking state, when having the overdischarge detection signal provided thereto from the overdischarge detecting circuit 17. As a result, in the embodiment, the logic circuit 19 of the battery pack 10A stops a discharge of the lithium-ion battery 12 for a load. Further, the logic circuit 19 of the battery pack 10A of the embodiment provides the signal of the low level provided to the terminal 15d also to the gate of the MOS transistor M13 to cause the MOS transistor M13 to enter a breaking state. It is noted that, in the battery pack 10A in the embodiment, it is preferable that the MOS transistor M11 and the MOS transistor M13 enter breaking states in synchronization with one another.

In the battery pack 10A in the embodiment, thus, the MOS transistor M13 is caused to enter a breaking state. Thereby, a loop formed by the lithium-ion battery 12, the thermistor R13, the resistor R14 and the MOS transistor M13 is prevented from being formed. Thus, a discharge of the lithium-ion battery 12 through the loop is stopped. Therefore, in the battery pack 10A in the embodiment, it is possible to stop a discharge of the lithium-ion battery 12 after a detection of a discharge.

Thus, in the battery pack 10A in the embodiment, having the serial circuit of the thermistor R13 acting as a temperature detecting circuit and the resistor R14, the MOS transistor M13 is provided between the series circuit and the negative electrode of the lithium-ion battery 12. As a result, it is possible to stop a further discharge of the lithium-ion battery 12 after an overdischarge of the lithium-ion battery is detected. Therefore, in the battery pack 10A in the embodiment, protection of the lithium-ion battery against temperature can be carried out with high accuracy, and also, it is possible to avoid a discharge of the lithium-ion battery 12 after an overdischarge of the lithium-ion battery is detected.

In the battery pack 10A in the embodiment, the MOS transistor M13 is provided inside the protection IC 15A. However, the MOS transistor M13 may not necessarily be provided inside the protection IC 15A. The MOS transistor M13 may also be provided outside the protection IC 15A. The MOS transistor M13 should be provided at a position such that the MOS transistor M13 can prevent a loop formed by the thermistor R13, the resistor R14 and the lithium-ion battery 12 from being formed.

The present invention has been thus described based on the embodiment. However, the present invention is not limited to the conditions of the embodiment. The conditions may be changed within the scope of the claims below, and can be appropriately determined for particular modes applying the invention.

What is claimed is:
1. A battery pack comprising:
a secondary battery;

first and second switch devices provided in wiring provided between the secondary battery and a load or a charging unit;

a protection circuit configured to detect an overcharge, an overdischarge or an overcurrent of the secondary battery and configured to control turning on and off of the first and second switch devices;

a series circuit of a first resistor and a thermistor disposed in the vicinity of the secondary battery and connected in parallel with the secondary battery;

a comparator provided inside the protection circuit configured to compare a voltage at a connection point between the thermistor and the first resistor with a reference voltage corresponding to a predetermined temperature and output a high temperature detection signal indicating a temperature of the thermistor exceeds the predetermined temperature;

an insensitive time setting circuit configured to receive the high temperature detection signal from the comparator and output the high temperature detection signal when the high temperature detection signal continues to be at a high level for a predetermined period or more and a third switch device connected between the first resistor and a negative electrode of the secondary battery, wherein the protection circuit is configured to turn off each of the first switch device and the third switch device when an overdischarge of the secondary battery is detected.

2. The battery pack as claimed in claim 1, wherein: each of the first, second and third switch devices comprises an n-channel MOS transistor.

3. The battery pack as claimed in claim 1, wherein: the thermistor comprises a NTC thermistor having a negative temperature coefficient.

4. The battery pack as claimed in claim 2, wherein: the thermistor comprises a NTC thermistor having a negative temperature coefficient.

5. A protection circuit for detecting an overcharge, an overdischarge or an overcurrent of a secondary battery and controlling turning on and off of first and second switch devices provided in wiring provided between the secondary battery and a load or a charging unit, the protection circuit comprising:

a comparator configured to
    compare a voltage at a connection point between a first resistor and a thermistor, which form a series circuit disposed in the vicinity of the secondary battery and connected in parallel with the secondary battery, with a reference voltage corresponding to a predetermined temperature, and
    output a high temperature detection signal indicating a temperature of the thermistor exceeds the predetermined temperature;

an insensitive time setting circuit configured to receive the high temperature detection signal from the comparator and output the high temperature detection signal when the high temperature detection signal continues to be at a high level for a predetermined period or more;

a third switch device connected between the first resistor and a negative electrode of the secondary battery; and a logic circuit configured to turn off each of the first switch device and the third switch device when an overdischarge of the secondary battery is detected.

* * * * *